INVENTOR.
Robert Galin
BY J.C. Evans
His Attorney

Aug. 23, 1966 R. GALIN 3,268,082
DOMESTIC APPLIANCE
Filed May 31, 1963 3 Sheets-Sheet 2

INVENTOR.
Robert Galin
BY
J.C. Evans
His Attorney

INVENTOR.
Robert Galin
BY J.C. Evans
His Attorney

United States Patent Office 3,268,082
Patented August 23, 1966

3,268,082
DOMESTIC APPLIANCE
Robert Galin, Bellbrook, Ohio, assignor to General Motors Corporation, Detroit, Mich., a corporation of Delaware
Filed May 31, 1963, Ser. No. 284,411
8 Claims. (Cl. 210—364)

This invention relates to suspension systems for machines having rotatably mounted driven parts and rotatable drive means and more particularly to a suspension system for a spin tub type clothes washer.

Recent developments in automatic clothes washers with spin type tubs have been directed to increasing the clothes loading capacity of such machines by enlarging the diameter of the spin tub portion of the machine. Other developments include reducing the size and weight of driving mechanisms associated therewith. The provision of increased clothes capacity and the increased diameter of the tub results in a greater probability that the clothes will be disposed in the spin tub so as to produce relatively substantial unbalanced forces thereon during the operation thereof. In order to prevent such unbalanced forces from causing severe vibrational disturbances in the machine the suspension system for the rotatably supported mass represented by the spin tub and clothes therein depends to a great extent upon the over-all supported weight to provide a stable platform against the gyrations and other movements of the supported tub and driving mechanism. The reduction in weight in the driving mechanism of newer machines along with the greater unbalanced forces present therein has created a problem since the known suspension systems for supporting such machines are unable to eliminate severe vibrational disturbances in the machine during certain phases of the operation thereof.

Accordingly, an object of the present invention is to provide an improved suspension system for minimizing gyrations due to vibrational disturbances in a centrifugal machine such as a spin tub type automatic clothes washer or the like.

A further object of the present invention is to provide an improved suspension system including means for selectively damping lateral and angular modes of vibration in a centrifugal machine such as a spin tub type automatic clothes washer or the like.

A further object of the present invention is to provide an improved suspension system for a spin tub in an automatic washing machine including means for minimizing gyrations of the tub at its critical speed and means for compensating for the lateral and angular modes of vibration of the machine.

A further object of the present invention is to provide an improved suspension system including means for effectively isolating the lateral and angular modes of vibration in a centrifugal type system and to include means in the suspension system for effectively separately damping such lateral and angular modes of vibration.

A further object of the invention is to provide an improved suspension system for supporting a rotatable mass in a free floating manner including means for isolating lateral and angular modes of vibration and means for damping such separated modes of vibration.

Further objects and advantages of the present invention will be apparent from the following description, reference being had to the accompanying drawings wherein a preferred embodiment of the present invention is clearly shown.

Figure 1:
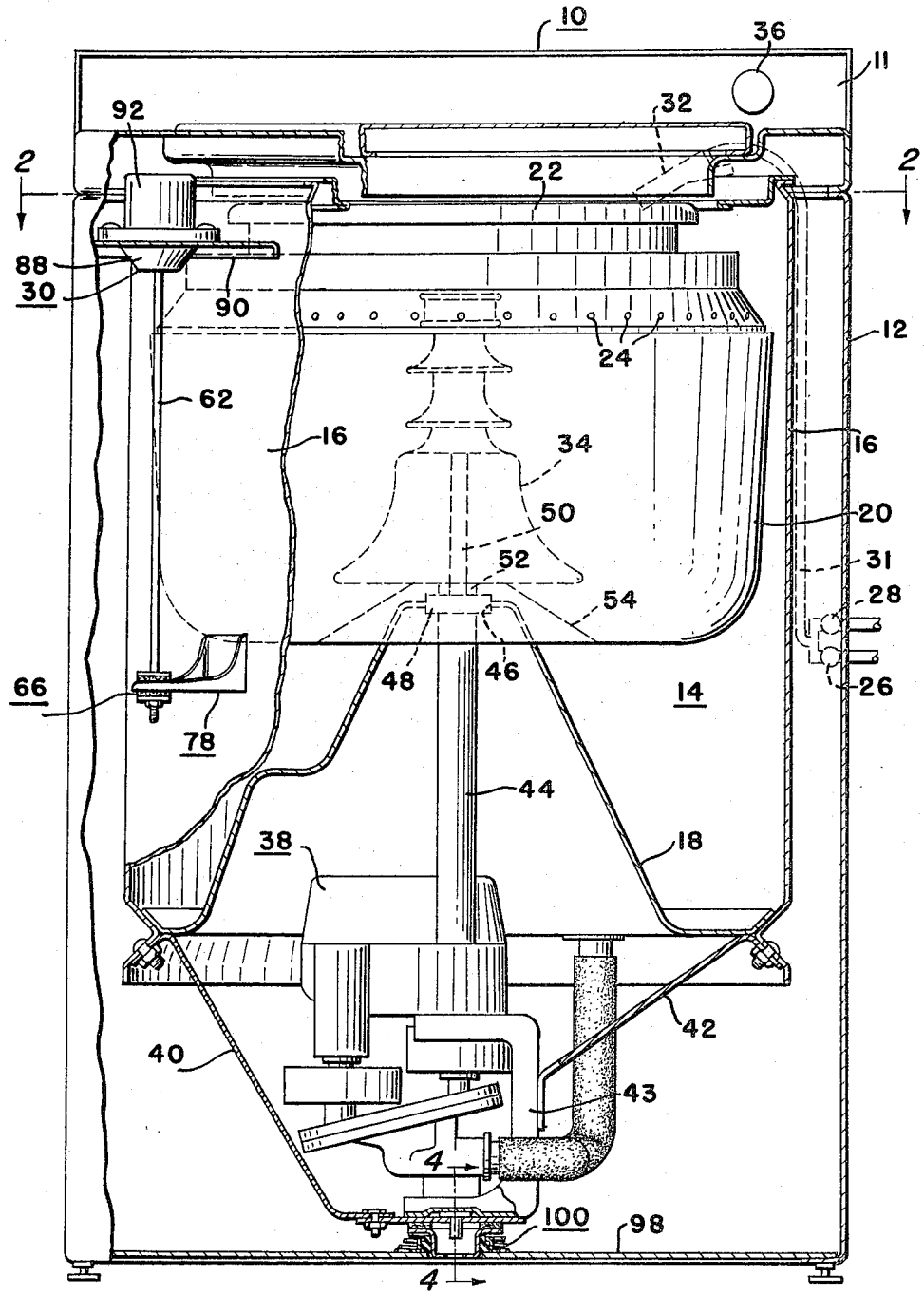
FIGURE 1 is a schematic sectional view partly in elevation of a clothes washer provided with the suspension system of the present invention.
Figure 2:
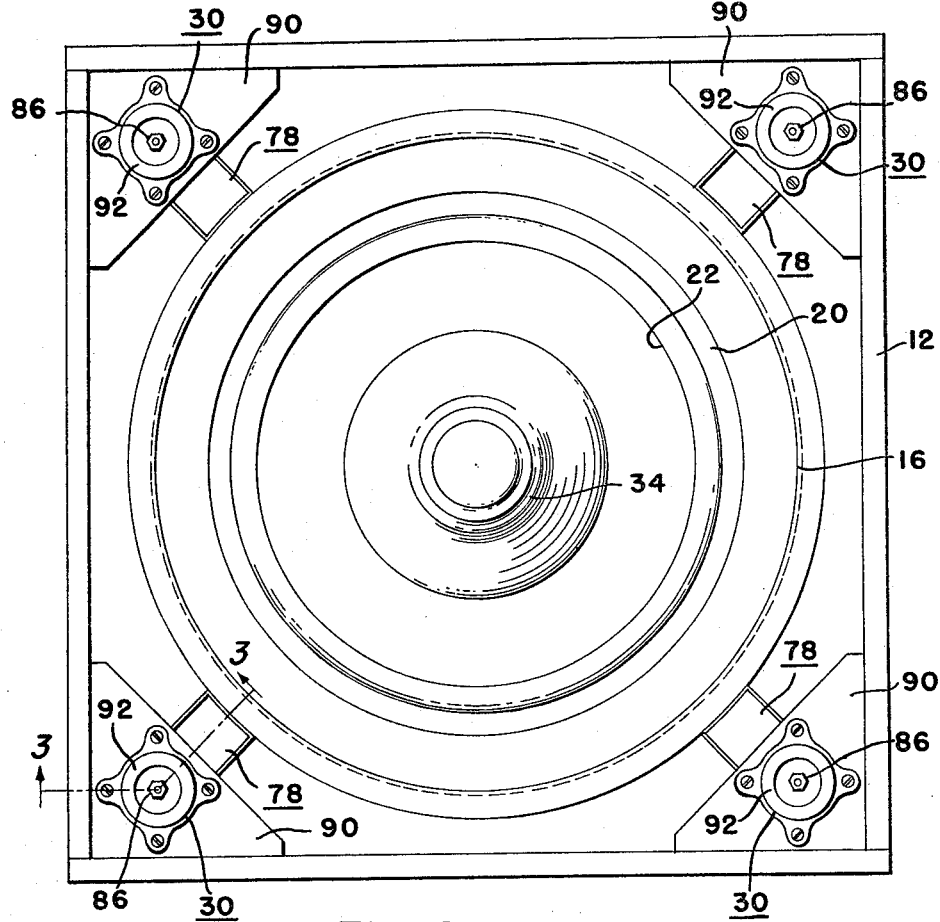
FIGURE 2 is a view in horizontal section taken along the line 2—2 of FIGURE 1.

Referring now to the drawings, in FIGURE 1 the invention is representatively illustrated as being associated with a clothes washer 10 including a control housing portion 11 and a casing 12 enclosing a water container chamber 14 formed by a cylindrical wall 16 having an open upper end and a lower end closed by a bulkhead 18. Within the cylindrical water container wall 16 is a spin tub 20 having a top opening 22 and a plurality of centrifuging ports 24. The ports 24 are designed to permit the egress of water from the tub 20 when the tub is rotated at high speed. For filling the tub 20 with water a conventional water supply system is provided including a hot water solenoid actuated valve 26 and a cold water solenoid operated valve 28 which are manifolded into a mixed water supply conduit 31 which terminates at a chute 32 overlying the top opening 22 of the tub 20. Within the tub 20 an agitator or pulsator 34 is adapted to reciprocate, to circulate or agitate the water admitted through the water supply conduit 31. Thus, clothing placed within the tub 20 is washed as the agitating action of the pulsator 34 causes surging currents of washing fluid and any included washing agent to pass through the clothing fabric. Conventional sequential operating timer means shown generally at 36 on the control housing 11 may be included to selectively admit water through the supply conduit 31, to spin the tub 20 and to vertically reciprocate the agitator or pulsator 34.

The agitator element 34 and spin tub 20 are operatively associated with an agitating and spin mechanism 38 shown rigidly secured to the underside of the bottom bulkhead 18 of the imperforate water container 14 by suitable fastening means such as brackets 40 and 42 connected between a C-shaped support arm portion 43 of the mechanism 38 and the bulkhead 18. The agitating and spin mechanism 38 includes a stationary shaft enclosing housing 44 held concentrically of the bottom bulkhead 18 by the brackets 40 and 42. The housing 44 is directed upwardly through an opening 46 in the bulkhead 18 where a sealing gasket 48 is provided on the bulkhead 18 in sealing engagement with the housing 44 to prevent leakage along the outer periphery thereof. Extending upwardly from the stationary shaft enclosing housing 44 is an agitator pulsate shaft 50 to which the agitator 34 is connected and a spin shaft 52 which is connected by suitable means to the bottom wall 54 of the spin tub 20. The brackets 40, 42 serve to locate the agitator pulsate shaft 50 and spin shaft 52 in colinear relationship with the center line of both the spin tub 20 and the pulsator 34. Further details of the agitate and spin mechanism 38 and the operation thereof are set forth in the U.S. Patent to Brucken 3,087,321 issued April 30, 1963, with it being understood that the above-described arrangement between the spin tube 20, water container 16 and agitate and spin mechanism 38 is merely representative of a typical washing machine having a rotatably driven spin tub that may become unbalanced during the rotation thereof and thus gyrate and oscillate in a manner that will produce a substantial vibrational disturbance in the machine unless a suspension system including damping means is provided in association therewith.

By virtue of the fact that the agitating and spinning mechanism 38 is rigidly fixed to the water container 16 any vibrational motion of the spin tub 20 during the spinning thereof will be transmitted therefrom through the spin shaft 52, the stationary shaft enclosing housing portion 44, the agitating and spin mechanism 38, and the brackets 40, 42 into the water container 16 which thus serves as a movable platform for the operative parts of the machine. More particularly, in machines of the above illustrated type any unbalanced loading of clothes in the spin tub 20 can produce a resultant centrifugal force acting thereon that is offset by a predetermined distance from the center of gravity of the suspended mass represented by the spin tub 20, the water container 16 and the agitating and spin mechanism 38. Such forces induce superimposed vibrational modes in the moving mass that will cause a fixed supporting framework for the moving mass, such as casing 12, to vibrate in a severe manner in the absence of vibration damping means. One of these modes is a lateral vibration, i.e., displacement of the tub 20 and the components connected thereto perpendicular to the axis of the rotation of the tub 20. The other of these modes is an angular vibration constituting movement of the tub 20 and the components connected thereto angularly about the axis of rotation thereof.

In accordance with certain of the principles of the present invention an improved suspension system is provided to dampen any excessive gyrating or swinging movement of the tub 20, water container 16 and agitate and spin mechanism 38 to thereby minimize such movement to prevent any substantial vibration in the casing 12 of the machine even though the machine is operated at relatively high r.p.m.'s.

Figure 3:
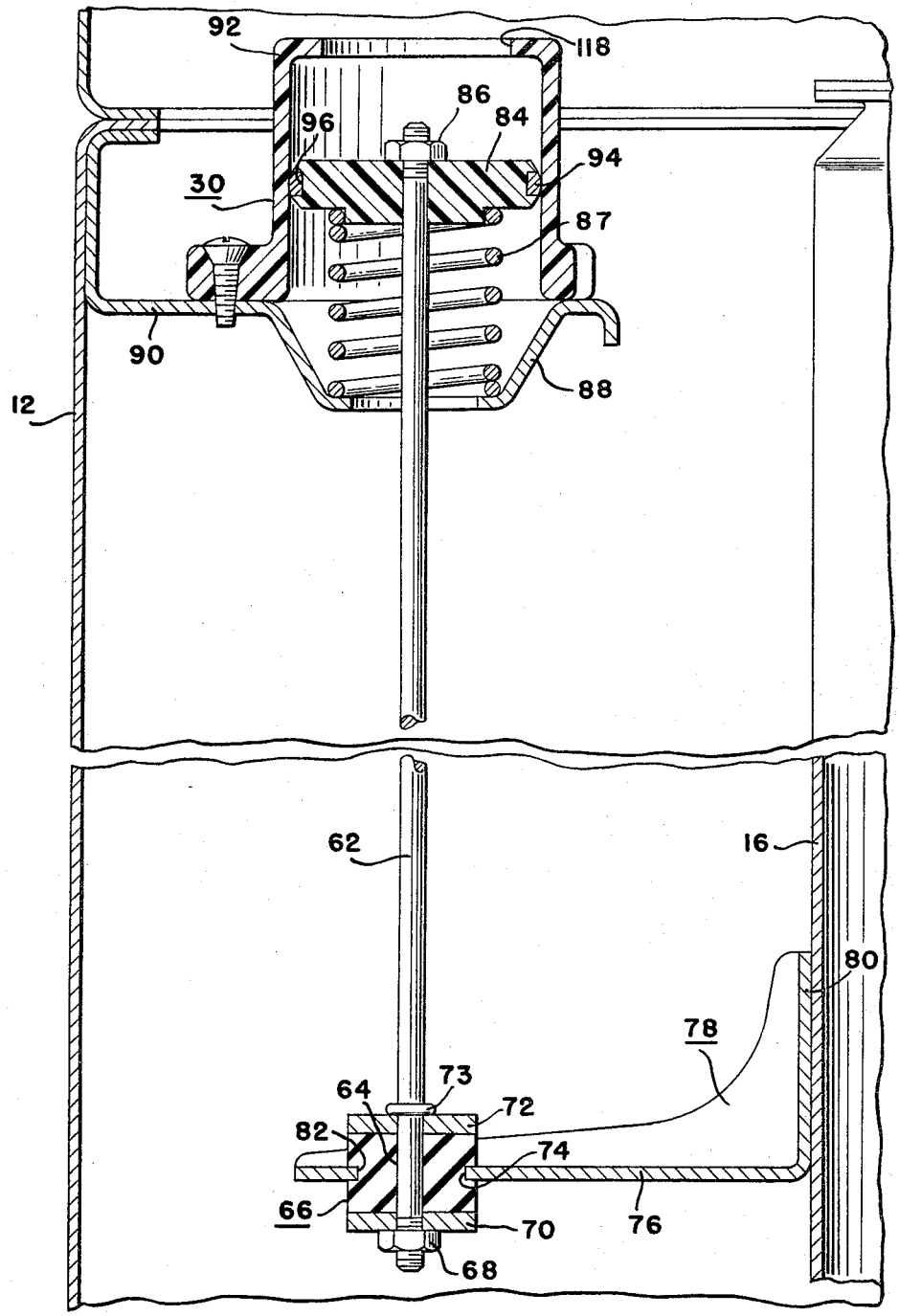
FIGURE 3 is an enlarged view in vertical section taken along the line 3—3 of FIGURE 2.

More particularly, the improved suspension system first includes a rod suspension assembly 30 located at each of the diagonal corners of the casing 12. Each of the rod assemblies 30, as best shown in FIGURE 3, includes an elongated generally vertically directed rod 62 having the lower end thereof directed through an opening 64 in a grommet 66 of resilient material, for example rubber. The grommet 66 is secured on the rod 62 by a lock nut 68 threadably engaging one end of the rod 62 to hold a plate 70 against the bottom of grommet 66 for biasing it against an upper plate 72 positioned relative to grommet 66 by a suitable shoulder 73 on rod 62. The grommet 66 is received in an opening 74 through one arm 76 of a bracket 78 having another arm 80 thereof fastened on the outer surface of the water container wall 16 at a location approximately at the center of gravity of the suspended system represented by the spin tub 20, the water container 16 and the agitate and spin mechanism 38 and items associated therewith. The grommet includes a groove 82 in the outer periphery thereof to form flange portions thereon that resiliently engage the upper and lower surfaces of the arm 76 to thereby provide a measure of flexibility between the rod 62 and the bracket 78 whereby the supported system can substantially freely float relative to the casing 12.

The upper end of each of the rods 62 is secured to a piston 84 by means of a nut 86 threaded on the end thereof and the piston 84 is supported by a coil spring 87 mounted in a cup-shaped retainer 88 depending from a gusset plate bracket 90 secured at the diagonal corner of the upper edge of the casing 12. Each of the springs 87 carry a substantial portion of the weight of the mass suspended on the rods 62. In the illustrated embodiment a cylindrical tubular element 92 of suitable plastic material, for example nylon, is fastened to the bracket 90 to slidably receive the piston 84 whereby a piston ring 94 of stainless steel material supported in a groove 96 in the outer periphery of the piston 84 is in frictional engagement with the inner surface of element 92 so that the relative movement between the piston 84 and the cylinder 92 will produce a damping action of any movement of the rod 62 during operation of the device supported thereby.

In addition to the support afforded by the springs 87 a transverse cross brace bar 98 at the bottom of the casing 12 spans the diameter of the suspended mass and carries a vibration damping or snubber mechanism arrangement 100 for supporting approximately one-quarter of the suspended mass in the illustrated embodiment.

Figure 4:
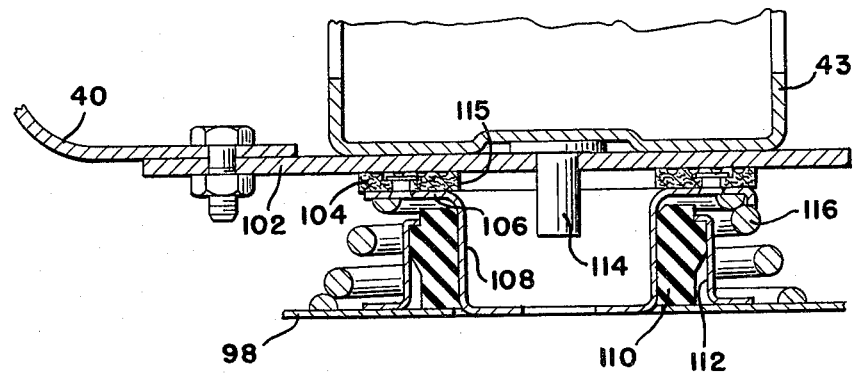
FIGURE 4 is an enlarged view in vertical section taken along the line 4—4 of FIGURE 1.

The snubber arrangement, as best shown in FIGURE 4, more particularly comprises a transverse plate portion 102 on the bottom of the C-shaped support arm portion 43 of the agitate and spin mechanism 38 having a flat, smooth bottom surface. Engaging this flat bottom surface is a grooved bearing ring 104 of graphited sintered bronze or other suitable material. These surfaces are kept free of lubricant excepting the lubricant which might be obtained from the contacting surfaces themselves such as powdered graphite. The ring 104 is riveted at three points to an inverted hat-shaped member 106 having its crown portion 108 inserted in the center of a circular ring 110 of natural or synthetic rubber or the like. The ring 110 is held in place by a flanged metal member 112 having the upper edge thereof connected thereto and a bottom portion fastened to the diagonal cross brace or bar 98. The diagonal bar 98 is in turn fastened at its opposite ends to the inturned flanges at the bottom edge of the casing 12. A pin 114 is fastened to the plate portion 102 and extends downwardly therefrom through a large aperture 115 in the ring 104. The pin 114 extends into the interior of the crown portion 108 of the hat-shaped member 106. Extreme lateral movement at the lower portion of the suspended mass is thereby limited by the engagement of the pin 114 with the inner surface of the crown 108 of the member 106. To apply a proper load to the adjacent friction surfaces of the members 102, 104 there is provided a conical compression type coil spring 116 surrounding the ring 112 so that its lower end is supported upon the cross brace 98 and its upper end held in engagement with the rim of the inverted hat-shaped member 106.

As is well known a rotating mass such as the spin tub 20 in the illustrated arrangement when subject to unbalanced forces during the rotation thereof will have two primary modes of vibration as discussed above. In the illustrated arrangement it has been found desirable to connect the ends of the suspension rod 62 at approximately the center of gravity of the mass suspended thereon in order to minimize the displacement of the suspended mass through the critical speed of rotation of the spin tub 20. In one operative arrangement of the illustrated type of machine the total weight of the mass suspended by the suspension rods 62 is approximately 140 pounds and the diameter of the spin tub 20 is in the range of twenty-two and one-half inches. The system is arranged so that each of the rod assemblies carries approximately three-sixteenths of the weight of the suspended mass and the snubber assembly 100 carries approximately one-fourth of the weight thereof and the spin tub 20 is rotated from a standstill to a speed in the range of 1,000 r.p.m. In this case the critical speed of the system occurs in the range of 50 r.p.m. and it is found that the snubber assembly 100 effectively damps the vibrational modes through this phase of operation to prevent any severe vibrational disturbances in the casing 12.

Once the spin tub 20 passes through the critical speed, the suspension system continues to damp vibrations induced thereby in the following manner. Any lateral mode of vibration is effectively damped by the snubber assembly because of the frictional engagement between the plate 102 and the bearing ring 104. Because of the length of rods 62 and the flexibility between the suspended mass and the rod assemblies provided by the grommet 66, lateral movement of the water container 16 will produce little or no vertical movement of the piston ring 94 relative to the tubular element 92; hence the damping action of the rod assemblies on lateral vibration is relatively insignificant. However, the displacements of the suspended mass produced by the angular mode of vibration causes diagonally opposite pistons 84 to move oppositely within the cylinders 92 associated therewith to produce frictional forces therebetween sufficient to effectively damp the angular vibrational mode in the system. It should be noted that the relationship between each piston 84 and cylinder 92 produces a positive frictional damping force in both upward and downward motions of the rods 62 so that the damping action of the rod assemblies is highly effective notwithstanding the direction of movement of the mass suspended thereby.

By virtue of the fact that the rod suspension assemblies 30 effectively support the mass suspended thereon in a somewhat free floating manner, the system is able to effectively damp angular vibrational modes produced by relatively large unbalanced forces acting on the spin tub 16 even though the weight of the total suspended mass is reduced because of an economically designed lightweight drive mechanism.

A further feature of the present invention is that the weight supported by the rod suspension assemblies 30 and the snubber 100 can be re-distributed therebetween to optimize the damping action thereof by tightening the nut 86 on the upper end of each of the rods 62 by inserting a tool through an opening 118 in the top of each of the cylinders 92. Adjustment of nut 86 causes the piston 84 to move relative to the bracket 90 to thereby change the compression of spring 86 and the load carrying capacity thereof.

While the present invention is illustrated as being associated with a washing machine having a rotatable spin tub portion, it will be appreciated that the improved suspension system can be associated with any system including a centrifugal type device producing superimposed or decoupled lateral and angular vibrational modes and the universal type displacement associated therewith.

The separate damping of angular vibrational modes and lateral modes of vibration is particularly advantageous in washing machines of the aforementioned type since the diameters of spin tubs and clothes capacity has increased while the overall weight of the suspended mass has decreased. This combination of circumstances has increased the gyrations of the suspended mass to a point where conventional suspension systems will not remain stable but the improved system has been found highly suitable for maintaining a relatively stable support platform capable of operating high r.p.m.'s and substantial unbalanced loads without producing undesirable vibrations within the machine framework during the operation of the washing machine.

In certain applications sufficient damping against angular modes of vibration may be produced by the provision of frictional damping rings 94 and tubular cylinders 92 on only two adjacent rod suspension assemblies 30. For example, in the illustrated arrangement the two front assemblies 30 can be modified to eliminate the rings 94 and cylinders 92 associated therewith so that the assemblies merely support a part of the suspended mass without providing any snubbing action. This obviously reduces the cost of the suspension system.

While the embodiment of the present invention as herein disclosed constitutes a preferred form, it is to be understood that other forms might be adopted.

What is claimed is as follows:

1. A suspension system comprising, fixed support means, a rotatable spin tub, drive means for rotating said spin tub, movable support means for supporting said drive means and said spin tub, suspension means including an elongated rod for supporting said movable support means on said fixed support means, means for connecting one end of said elongated rod to one of said support means, spring means on the other of said support means, connector means on the opposite end of said elongated rod having said spring means in engagement therewith whereby said spring means resiliently supports said movable support means for relative movement with respect to said fixed support means, said spring means serving to resiliently connect said opposite end of said rod to said other of said support means to allow lateral and vertical relative movement of said rod with respect to said other support means during movement of said movable support means both toward and away from said fixed support means without fixedly restraining such movements, and coacting means on said elongated rod and said other of said support means for damping the transfer of vibrations from said movable support means to said fixed support means.

2. In the combination of claim 1, said one of said support means being said movable support means and said other of said support means being said fixed support means.

3. In the combination of claim 1, said other of said support means including a hollow cylindrical element having an opening at one end thereof through which said opposite end of said rod is directed, said connector means on said opposite end of said rod being a piston member slidably received within said cylinder for reciprocal movement relative to said cylindrical element to guide said rod for free vertical reciprocation with respect to said other of said support means during movement of said movable support means both toward and away from said fixed support means.

4. In the combination of claim 1, said suspension means further including a second elongated rod located on the opposite side of said spin tub from said first-mention elongated rod, second means for connecting one end of said second rod to said one of said support means, second spring means on the other of said support means, second connector means on the opposite end of said second rod being resiliently engaged by said second spring means whereby said second spring means supports a predetermined portion of the weight of said movable support means, said second spring means resiliently connecting said second rod to said other support means for allowing free relative lateral and vertical movement of said movable support means with respect to said fixed support means during movement of said movable support means both toward and away from said fixed support means, and second coacting means on said second rod and said one of said support means for damping vibrations in the movable support means, said rods being movable in opposite directions upon relative movement between each of said support means, each of said damping means simultaneously damping the transfer of vibrations from said movable support means to said fixed support means during the opposite movement of each of said rods without fixedly restraining the relative movement between each of said support means.

5. In the combination of claim 3, said one of said support means being said movable support means and said other of said support means being said fixed support means.

6. In the combination of claim 3, said coacting damping means being an annular ring of friction material seated in the outer periphery of said piston member, said ring coacting with said cylinder during both up and down movement of said movable support means to reduce the transfer of vibrations from said movable support means to said fixed support means.

7. In the combination of claim 4, each of said damping means including a cylindrical member secured to said fixed support means at opposite points thereon, each of said connector means on said rods being piston members slidably received within a respective one of said cylinder members and being reciprocal relative thereto in opposite directions from one another during relative movement between each of said support means.

8. In the combination of claim 6, said opposite end of said rod being shifted upon lateral movement of said movable support means with respect to said fixed support means to cause said piston member to tip relative to said cylinder whereby said friction ring produces damping against such lateral movement.

References Cited by the Examiner
UNITED STATES PATENTS

| | | |
|---|---|---|
| 974,687 | 11/1910 | McLeod. |
| 1,087,519 | 2/1914 | White. |
| 2,437,631 | 3/1948 | Wood. |
| 2,987,190 | 6/1961 | Bochan _____ 62—23 X |
| 3,021,956 | 2/1962 | Bochan _____ 210—364 |
| 3,069,887 | 12/1962 | Gould _____ 68—23 |

REUBEN FRIEDMAN, *Primary Examiner.*

J. L. DECESARE, *Assistant Examiner.*